United States Patent
Murty et al.

(10) Patent No.: US 8,392,069 B2
(45) Date of Patent: Mar. 5, 2013

(54) METHOD FOR MANAGING FAULTS IN A MAGNETO-RHEOLOGICAL HYDRAULIC POWER STEERING SYSTEM

(75) Inventors: Balarama V. Murty, West Bloomfield, MI (US); Suresh Gopalakrishnan, Farmington Hills, MI (US); Kenneth J. Shoemaker, Highland, MI (US); Chandra S. Namuduri, Troy, MI (US); Bradley Bezzina, Dearborn Heights, MI (US); Ebrahim Handy, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/362,483

(22) Filed: Jan. 31, 2012

(65) Prior Publication Data

US 2012/0130594 A1    May 24, 2012

Related U.S. Application Data

(62) Division of application No. 12/412,705, filed on Mar. 27, 2009.

(51) Int. Cl.
*B62D 5/30* (2006.01)
*B62D 5/04* (2006.01)

(52) U.S. Cl. ............ 701/43; 180/405; 180/446
(58) Field of Classification Search .......... 701/43; 180/446, 404, 405
See application file for complete search history.

(56) References Cited

U.S. PATENT DOCUMENTS

| | | | | |
|---|---|---|---|---|
| 4,593,358 A * | 6/1986 | Takeshima et al. | ............ | 701/41 |
| 4,626,994 A * | 12/1986 | Yabe et al. | ............ | 701/41 |
| 4,627,509 A * | 12/1986 | Adams et al. | ............ | 180/422 |
| 4,694,927 A * | 9/1987 | Nagae | ............ | 180/423 |
| 5,749,431 A * | 5/1998 | Peterson | ............ | 180/422 |
| 7,571,040 B2 * | 8/2009 | Murty et al. | ............ | 701/41 |

* cited by examiner

*Primary Examiner* — Kevin Hurley
(74) *Attorney, Agent, or Firm* — John A. Miller; Miller IP Group, PLC

(57) ABSTRACT

A system and method for managing faults occurring in a power steering system in a vehicle is disclosed that has particular application for an MRHPS system to provide reliable functioning of the power steering system. The method includes detecting a fault condition in the MRHPS system and selecting a safe mode from a plurality of predetermined safe modes based on the fault condition. The plurality of predetermined safe modes include a normal operation mode, an engine speed follow mode, a manual mode, a fixed duty cycle mode and a voltage control mode. If a fault condition is detected, the method applies the safe mode to manage the fault condition.

20 Claims, 9 Drawing Sheets

METHOD FOR MANAGING FAULTS IN A MAGNETO-RHEOLOGICAL HYDRAULIC POWER STEERING SYSTEM

CROSS-REFERENCE TO RELATED APPLICATIONS

This application is a divisional application of U.S. patent application Ser. No. 12/412,705, filed Mar. 27, 2009, titled Pump Speed Command Generation Algorithm for Magneto-Rheological Power Steering Coupling.

BACKGROUND OF THE INVENTION

1. Field of the Invention

This invention relates generally to a power steering system for a vehicle and, more particularly, to a system and method for managing faults in a magneto-rheological power steering pump used in a power steering assembly for a vehicle.

2. Description of the Related Art

It is known in the art to provide a power steering system for a motor vehicle to assist a driver in steering the vehicle. Typically, the power steering system employs hydraulics. The hydraulic power steering system typically employs an engine driven hydraulic power steering pump for generating pressurized fluid that is coupled to a hydraulic steering gear of the motor vehicle. Since the power steering pump is driven directly by the engine using a belt, its speed is determined by the engine and it operates continuously as long as the engine is running, resulting in continuous losses due to constant circulation of the hydraulic fluid through the steering gear. Continuous operation of the power steering pump at speeds dictated by the engine speed, even when no steering assist is required, results in increased fuel consumption. In addition, the power steering pump is calibrated to provide the required flow and pressure for the worst case engine speed, which could be near idle, under static steering conditions. Such calibration of the power steering pump results in a much higher pump flow at higher engine speeds further increasing the losses in the hydraulic power steering system, which also results in increased fuel consumption.

More recently, electro-hydraulic power steering systems have been used to decouple the power steering pump from the engine and provide an on-demand hydraulic pressure using an electric motor to drive the hydraulic power steering pump. One known electro-hydraulic power steering system incorporates a hydraulic power steering pump driven by a brushless direct current electric motor controlled by a pulse width modulated inverter. Also, there are electrically driven steering systems that do not use any hydraulic fluids. However, the electro-hydraulic power steering system requires a costly high power electric motor, power electronics for controlling the speed of the electric motor, and a reliable electrical power supply including an engine driven alternator and battery. Further, such systems have high overall losses including losses through the engine alternator, power electronics, electric motor and power steering pump.

Also known in the art is a magneto-rheological hydraulic power steering (MRHPS) system that minimizes power losses in a power steering pump and provides variable flow and pressure of the pump independent of engine speed. The MRHPS system for a vehicle controls the pressure of the steering system using a power steering pump. However, this system does not provide control of steering effort as a function of vehicle speed resulting in a consequent loose feeling of the steering at high speeds and lesser steering assist at lower speed. Further, the system does not provide precision on-center handling feel required at higher pump speed even when the hand-wheel angle rate is very small. Also, the system does not provide uninterrupted operation by managing various possible fault conditions occurring in it.

SUMMARY OF THE INVENTION

In accordance with the teachings of the present invention, a system and method for managing faults occurring in a power steering system in a vehicle is disclosed that has particular application for an MRHPS system to provide reliable functioning of the power steering system. The method includes detecting a fault condition in the MRHPS system and selecting a safe mode from a plurality of predetermined safe modes based on the fault condition. The plurality of predetermined safe modes include a normal operation mode, an engine speed follow mode, a manual mode, a fixed duty cycle mode and a voltage control mode. If a fault condition is detected, the method applies the safe mode to manage the fault condition.

Additional features of the present invention will become apparent from the following description and appended claims, taken in conjunction with the accompanying drawings.

DETAILED DESCRIPTION OF THE EMBODIMENTS

This invention relates generally to a system and method for managing faults in a magneto-rheological hydraulic power steering system in a vehicle. However, as will be appreciated by those skilled in the art, the method for managing faults occurring in the power steering system may have other applications.

Figure 1:
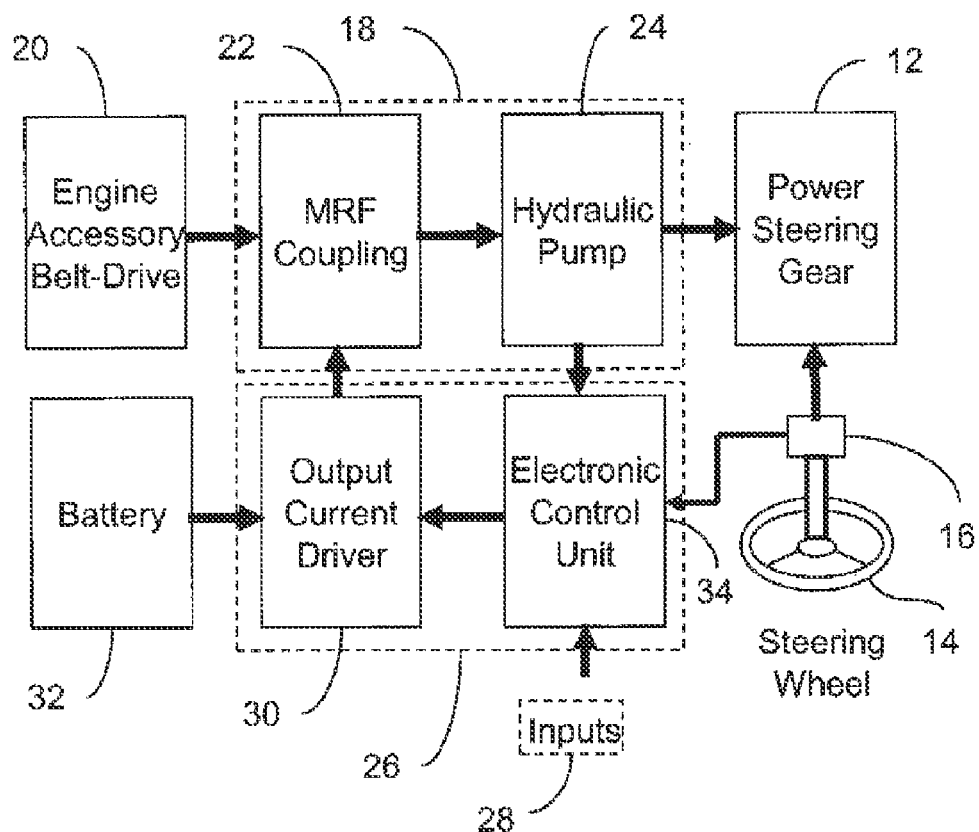
FIG. 1 illustrates an MRHPS System.

FIG. 1 illustrates an MRHPS system 10 for a vehicle. The MRHPS system 10 includes a steering actuator, such as a power steering gear 12, and a hand-wheel or steering wheel 14, hereinafter used interchangeably, operatively connected to the steering gear 12. The MRHPS system 10 also includes a steering wheel sensor 16 operatively connected to the steering wheel 14 to sense the hand-wheel angle and/or hand-wheel torque exerted on the steering wheel 14 by an operator.

The MRHPS system 10 further includes an MRHPS pump assembly 18 operatively connected to the steering gear 12 and driven by an output member of an engine (not shown) via an accessory belt drive 20. The MRHPS pump assembly 18 includes a magneto-rheological fluid clutch or coupling 22 and a power steering pump 24. It should be apparent to those skilled in the art that the power steering pump 24 operates to provide a source of pressurized fluid to the steering gear 12 to assist in steering the vehicle. The magneto-rheological fluid coupling 22 is employed to directly and variably control the speed of the power steering pump 24 by controlling the torque transmitted from the belt drive 20 to the power steering pump 24. It should be appreciated that the magneto-rheological fluid coupling 22 may be part of the pump assembly 18, pulley, or a separate unit.

The MRHPS system 10 also includes an electronic controller 26 in electrical communication with the steering wheel sensor 16 and operable to receive and process a plurality of inputs 28 from sensors throughout the vehicle. The electronic controller 26 includes an electronic control unit 34 and an output current driver 30, such as a pulse width modulation (PWM) device. A PWM device provides a pulsating waveform that has an effective voltage lower than the input voltage. The output current driver 30 is in electrical communication with a coil 36, shown in FIG. 2, of the magneto-rheological fluid coupling 22 and is operable to provide a control current to the coil 36. The output current driver 30 and the electronic controller 26 are in electrical communication with an electrical power source 32, such as a battery and ground.

Figure 2:
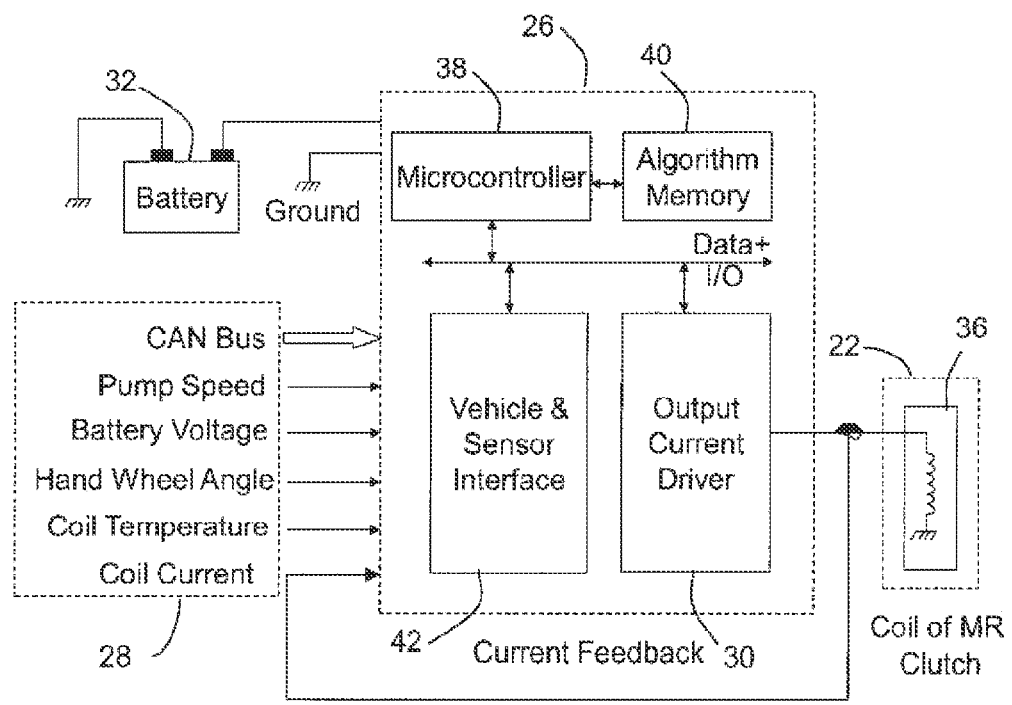
FIG. 2 illustrates a controller for determining the speed of a power steering pump or a power steering pump speed, hereinafter used interchangeably.

FIG. 2 illustrates the electronic controller 26 for determining the speed of a power steering pump used in a MRHPS power steering system of a vehicle. The electronic controller 26 includes a central processing unit (CPU) or microcontroller 38, a vehicle and sensor interface 42, and an algorithm memory 40. The output current driver 30 is also provided within the electronic controller 26. The electronic controller 26 receives various sensor inputs 28 in analog and/or digital form. The hand-wheel angle is the angle of rotation given to the steering wheel 14 of the vehicle. A hand-wheel angle input may be obtained from the steering wheel sensor 16, which is operable to provide incremental angle values in the form of a two phase pulse train with an index pulse to indicate the on-center or near zero position and/or an analog voltage proportional to the absolute angle. A speed of the vehicle or a vehicle speed, hereinafter used interchangeably, input may be determined from a combination of one or more vehicle wheel speed sensors, not shown. An engine speed input may be determined through a crank angle rotation sensor, not shown. Additional inputs may include a power steering pump speed input, a magneto-rheological fluid coupling coil current input, a magneto-rheological fluid coupling coil temperature input, a battery voltage and a brake pedal state. The inputs 28 may be provided to the controller 26 as discrete inputs as described above or via a vehicle communication bus, such as a controller area network (CAN) from other sub-systems. Those skilled in the art may recognize additional inputs other than those described herein that may be suitable for use with the present invention.

The vehicle and sensor interface 42 provides signal conditioning and/or conversion of the inputs 28 to a suitable digital form for use with the microcontroller 38. The algorithm memory 40 contains algorithms and look-up tables to be used by the microcontroller 38 in conjunction with the information supplied by the interface 42 to send a command signal to the output current driver 30. The command signal will direct the output current driver 30 to supply a current to the coil 36 thereby controlling the rotational speed of the power steering pump 24.

Figure 3A:
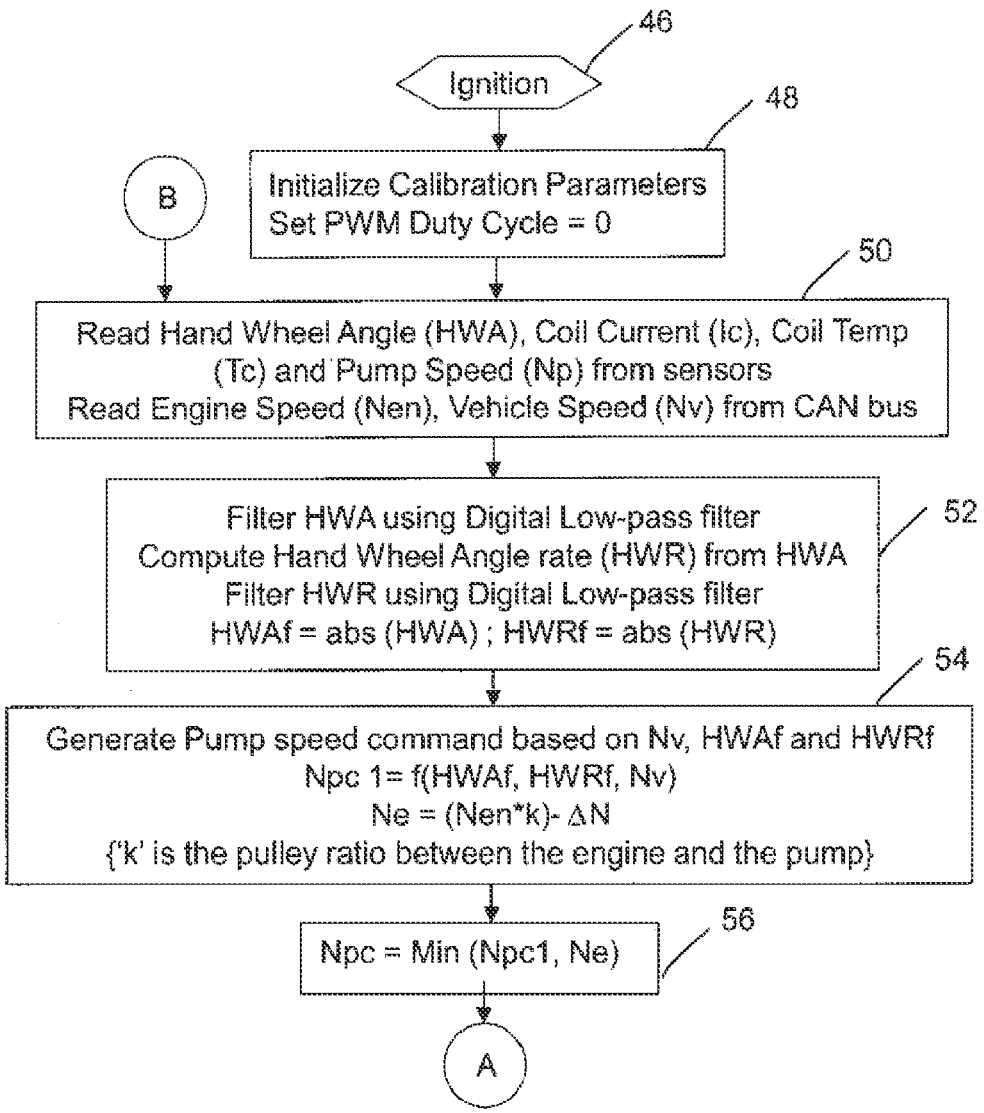
FIGS. 3a and 3b are a flowchart depicting a method for controlling the power steering pump speed.
Figure 3B:
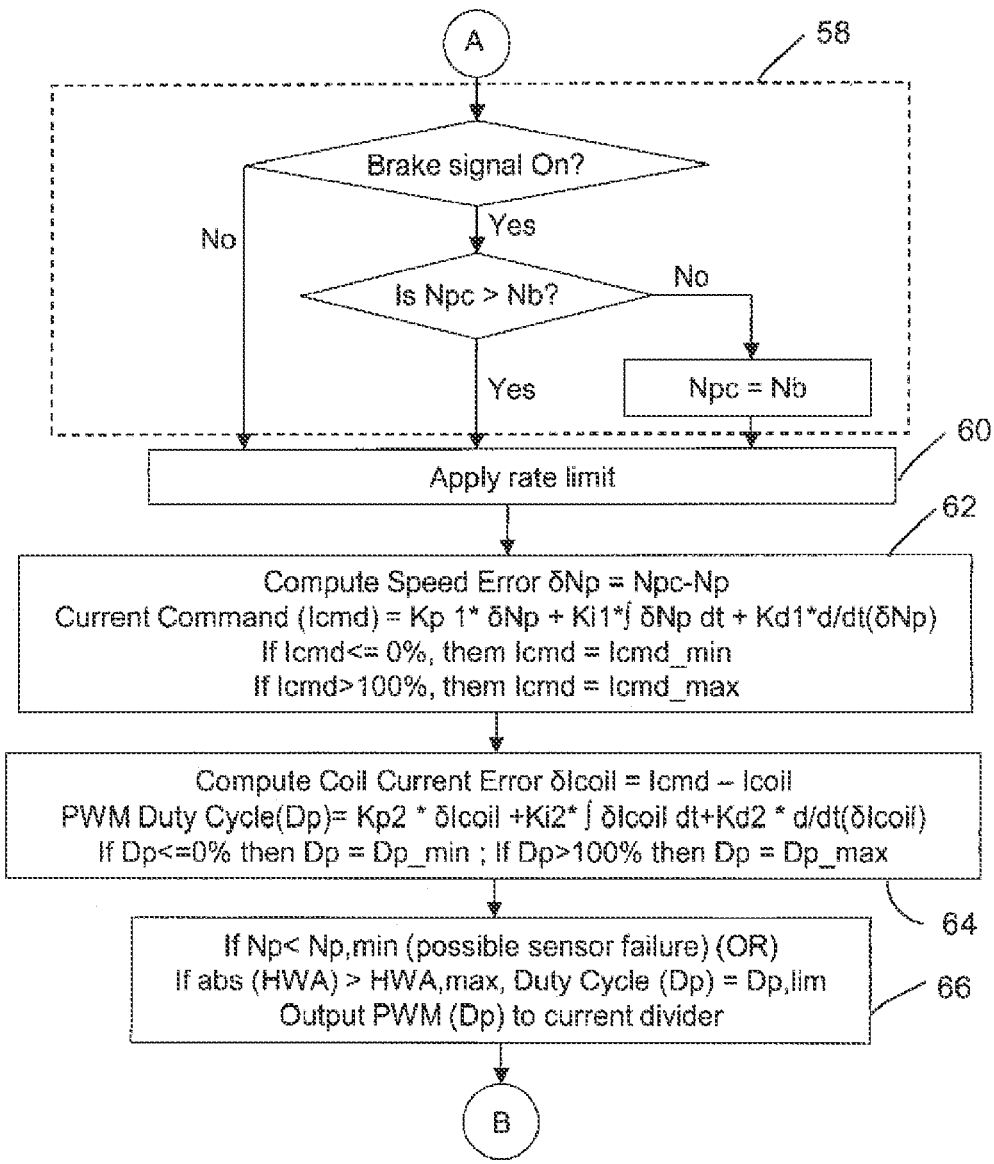

FIGS. 3a and 3b are a flowchart diagram 44 depicting a method for controlling the power steering pump speed according to one embodiment. The method is initiated upon ignition of engine of the vehicle at step 46. At step 48, calibration parameters are initialized by the electronic controller 26. Also, at the step 48, the PWM duty cycle of the output current driver 30 is set to zero value. At step 50, the various inputs 28 are read by the electronic controller 26. Some of the inputs 28, such as a value of hand-wheel angle, a current of the coil 36 or coil current $I_{coil}$, hereinafter used interchangeably, coil temperature $T_c$, a power steering pump speed $N_p$, engine speed $N_{en}$, and a vehicle speed $N_v$, are obtained as described above.

At step 52, a plurality of tasks are performed. First, the value of the hand-wheel angle is filtered using a digital low-pass filter to reduce noise. Then, a rate of change of the angle of rotation of the steering wheel 14 or a value of hand-wheel angle rate, hereinafter used interchangeably, is calculated from the value of hand-wheel angle. Then, the value of hand-wheel angle rate is also filtered using a digital low-pass filter to reduce noise. However, it will be readily apparent to a person of ordinary skill in the art that techniques other than the one mentioned above can be used for filtering the signals.

An absolute value of the hand-wheel angle HWAf is calculated from the hand-wheel angle and an absolute value of the hand-wheel angle rate HWRf is calculated from the hand-wheel angle rate. At step 54, a value of the power steering pump speed $N_{pc1}$ is determined based on the absolute value of the hand-wheel angle HWAf, the absolute value of the hand-wheel angle rate HWRf and the vehicle speed $N_v$. The value of power steering pump speed $N_{pc1}$ is determined using an arranged set of data or a look-up table, hereinafter used interchangeably, representing a set of values of the speed of the power steering pump corresponding to a set of values of the hand-wheel angle HWAf and the hand-wheel angle rate HWRf. Different look-up tables are used for different vehicle speeds $N_v$, as described below using the exemplary look-up tables in FIGS. 4 and 5. Alternatively, analytical functions can be used instead of look-up tables. Thus, the value of the power steering pump speed $N_{pc1}$ can be calculated as a function of the hand-wheel angle HWAf and the hand-wheel angle rate HWRf, as shown in equation (1).

$$N_{pc1} = f(HWAf, HWRf, N_v) \quad (1)$$

At step 54, a maximum possible value of the pump speed $N_e$ is determined by multiplying the engine speed $N_{en}$ by a pulley ratio value k and subtracting a delta value or pump speed offset $\Delta N$ from the multiplied value, as shown in equation (2).

$$N_e = (N_{en} \times k) - \Delta N \quad (2)$$

At step 56, if the value $N_{pc1}$ is more than a maximum possible value of the power steering pump speed $N_e$, the power steering pump speed $N_{pc}$ is set to $N_e$, otherwise $N_{pc}$ is set to the value $N_{pc1}$, as represented in equation (3).

$$N_{pc} = \text{Min}(N_{pc1}, N_e) \quad (3)$$

The maximum value of the power steering pump speed $N_e$ is chosen to correspond to that value, beyond which the internal flow by-pass valve gets activated. At step 58, if a brake signal is on and the value $N_{pc}$ is less than a constant power steering pump speed value $N_b$, then the value $N_{pc}$ is set to the value $N_b$. In one non-limiting embodiment, the value $N_b$ is 450 rpm. At step 60, a rate limit is applied to the change of power steering pump speed to eliminate abrupt changes to reduce any possible kick-back on the steering wheel 14 due to sudden jump in the power steering pump speed. This also helps in reducing the mechanical stresses on various components in the system. The rate limit value for positive changes in the power steering pump speed can be set to a high value to get a fast response for the command and for negative changes, and the rate limit value can be set to a lower value to avoid pump catch. For example, the rate limit value for positive and negative changes in power steering pump speed can be 100 krpm/sec and 1 krpm/sec, respectively. Having different rate limits for positive and negative changes in the power steering pump speed also helps in avoiding power steering pump speed dither and makes the control smooth.

At step 62, a power steering pump speed error $\delta N_p$ is computed by subtracting the sensor determined instantaneous value of the power steering pump speed $N_p$ from the determined power steering pump speed $N_{pc}$, as given in equation (4).

$$\delta N_p = N_{pc} - N_p \tag{4}$$

A current command value $I_{cmd}$ is determined by a proportional-integral-derivative (PID) controller acting on the power steering pump speed error $\delta N_p$ and is consistent with equation (5).

$$I_{cmd} = K_{p1} \times \delta N_p + K_{i1} \times \int \delta N_p dt + K_{d1} \times \frac{d(\delta N_p)}{dt} \tag{5}$$

Where $K_{p1}$, $K_{i1}$ and $K_{di}$ are the proportional, integral and derivative gains, respectively, of a PID controller.

If the calculated current command value $I_{cmd}$ is less than or equal to zero percent, the current command value $I_{cmd}$ is set to a pre-determined minimum value. Alternately, if the calculated current command value $I_{cmd}$ is greater than or equal to a hundred percent, the current command value $I_{cmd}$ will be set to a pre-determined maximum value.

At step 64, a coil current error $\delta I_{coil}$ is computed by subtracting a measured coil current value $I_{coil}$ from the determined current command value $I_{cmd}$, as shown in equation (6).

$$\delta I_{coil} = I_{cmd} - I_{coil} \tag{6}$$

Further, at the step 64, a PWM duty cycle value Dp is calculated. The PWM duty cycle value Dp is determined by a PID controller acting on the pump speed error and is consistent with the equation (7).

$$Dp = K_{p2} \times \delta I_{coil} \times K_{i2} \times \int \delta I_{coil} dt + K_{d2} \times \frac{d(\delta I_{coil})}{dt} \tag{7}$$

Where Dp is the PWM duty cycle and $K_{p2}$, $K_{i2}$ and $K_{d2}$ are the proportional, integral and derivative gains, respectively, of a PID controller.

If the calculated PWM duty cycle value Dp is less than or equal to zero percent, the PWM duty cycle value Dp will be set to a pre-determined minimum value. Alternately, if the calculated PWM duty cycle is greater than or equal to a hundred percent, the PWM duty cycle value Dp will be set to a predetermined maximum value. The use and operation of the PID controllers are readily understood by those skilled in the art.

At step 66, if the pump speed Np is less than a predetermined minimum value of pump speed Np.min, or if the absolute value of the hand-wheel angle HWAf is greater than a predetermined maximum value of the hand-wheel angle, the PWM duty cycle value Dp will be limited to a calibrated value Dp.lim to prevent heating of the power steering pump. Also, at the step 66, the calculated PWM duty cycle value Dp is sent by the controller 26 and to the current driver 30, and a current signal is provided from the current driver 30 to the coil 36.

During operation, the coil 36 is selectively and variably energized with electrical current from the current driver 30, thereby creating a magnetic field that passes through a magneto-rheological fluid contained within the magneto-rheological fluid coupling 22. When the magneto-rheological fluid is exposed to the magnetic field, the magnetic particles therein will align with the field and increase the viscosity, and thus, the strength of the magneto-rheological fluid resulting in torque transfer from the magneto-rheological fluid coupling 22 to the pump 24. The torque transfer ability or characteristic of the magneto-rheological fluid will vary with the intensity of the magnetic field. At the conclusion of the step 66, the algorithm 44 will run again with updated values of various sensor inputs 28 being read at the step 50.

Figure 4:
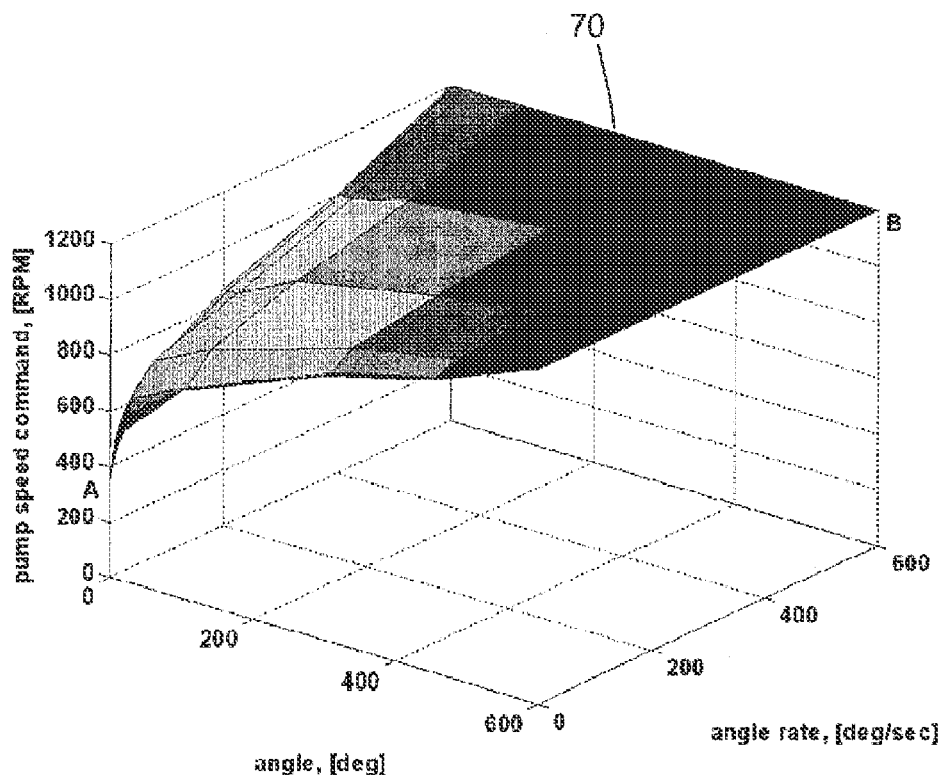
FIG. 4 is an exemplary two-dimensional look-up table depicting variation of power steering pump speed corresponding to a variation in the absolute value of a hand-wheel angle and absolute value of a hand-wheel angle rate of the vehicle at a given vehicle speed.

FIG. 4 is an exemplary two-dimensional look-up table 68 depicting variation of power steering pump speed $N_{pc1}$ corresponding to a variation in absolute value of the hand-wheel angle HWAf and the absolute value of the hand-wheel angle rate HWRf of the vehicle at a given vehicle speed. The X-axis represents the absolute value of hand-wheel angle HWAf in degrees (deg). The Y-axis shows the absolute value of hand-wheel angle rate HWRf in degree per second (deg/sec). The Z-axis represents the value of power steering pump speed $N_{pc1}$ in revolutions per minute (RPM). Plane 70 represents the variation of the value of power steering pump speed $N_{pc1}$ with the absolute value of the hand-wheel angle HWAf and the absolute value of hand-wheel angle rate HWRf. Point A is the lowest power steering pump speed value that corresponds to zero steering wheel angle and angle rate, and point B corresponds to the predetermined maximum power steering pump speed.

In one embodiment, two-dimensional look-up tables are used for determining the power steering pump speed command. A first look-up table is used for vehicle speeds below a predetermined value, for example 45 mph, and a second look-up table is used for speeds above the predetermined value. In both look-up tables, the power steering pump speed command value is a minimum at on-center, that is, when the hand-wheel angle is zero and also the hand-wheel angle rate is zero. The power steering pump speed command is ramped up as the absolute value of the steering wheel angle or the angle rate increases. For the first look-up table, the minimum power steering pump speed value at point A can be set to a lower value, for example, 350 rpm. For the second look-up table, the minimum power steering pump speed value at point A can be set to a higher value, for example, 400 rpm. The power steering pump speed command values for the second look-up table at other points can be increased linearly to higher values. Depending on the vehicle speed, one of the two tables is chosen for computing the power steering pump speed command.

In another embodiment, several two-dimensional look-up tables can be employed instead of using only two tables. The vehicle speed from zero to maximum can be divided into several speed ranges and for each range, one two-dimensional table can be used. The minimum value for the power steering pump speed command can be increased in steps as the vehicle speed increases. This method gives additional flexibility in fine tuning of the steering performance to the desired level.

In yet another embodiment, only a single two-dimensional look-up table corresponding to zero vehicle speed is used. At vehicle speeds above zero, the value corresponding to point A is increased while fixing point B at the same predetermined maximum value. Other points in the look-up table are linearly increased to higher values.

Figure 5:
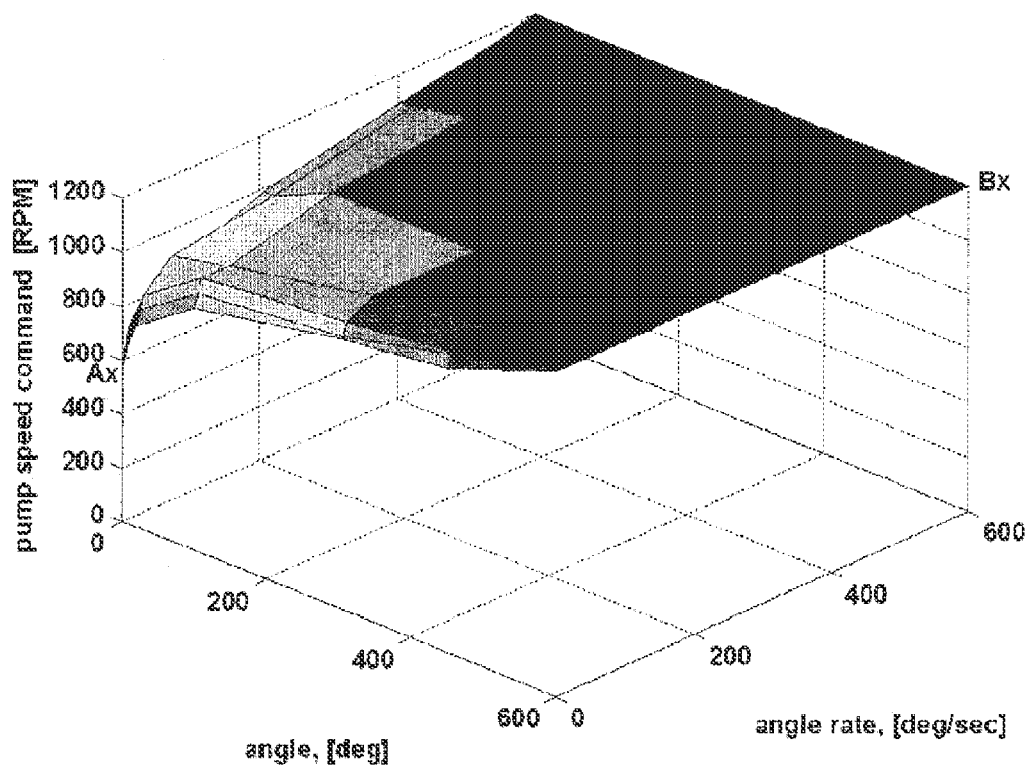
FIG. 5 is an exemplary two-dimensional look-up table depicting variations of power steering pump speed corresponding to variations in absolute value of hand-wheel angle and absolute value of hand-wheel angle rate of the vehicle at a threshold vehicle speed.

The maximum value for point A can be set to a predetermined maximum level Ax corresponding to a threshold vehicle speed, above which the value of point A can be fixed at Ax, as shown in FIG. 5, which shows the exemplary look-up table 72 corresponding to a threshold vehicle speed. It should be noted that Ax>A, whereas Bx=B.

Figure 6:
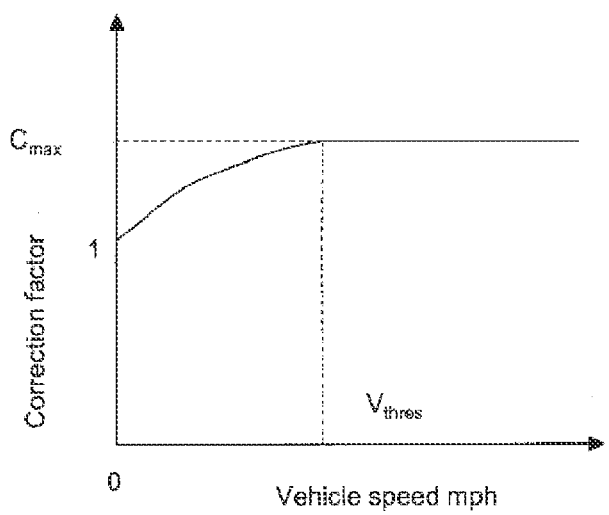
FIG. 6 is an exemplary graph depicting a correction factor to be used to alter look-up tables according to the varying vehicle speed.

FIG. 6 is an exemplary graph depicting a correction factor to be used to alter the look-up tables according to the varying vehicle speed. The value for point A is changed according to the vehicle speed using the correction factor as obtained from the graph in FIG. 6. The steering performance can be tuned by varying $C_{max}$ and $V_{thres}$. Lower values of $C_{max}$ and higher values of $V_{thres}$ result in stiffer steering feel. Similarly, higher values of $C_{max}$ and lower values of $V_{thres}$ results in lighter steering feel.

In another embodiment of the invention, a method for detecting a fault condition in the MRHPS system and providing a default mode of operation according to the detected fault condition is described. The default mode of operation is one among the following modes of operation.

Mode 1 is a normal operation mode. In this mode the speed of the power steering pump is controlled according to the method in FIG. 3.

Mode 2 is an engine speed follow mode. In this mode the PWM duty cycle follows a closed loop control such that the power steering pump speed is directly governed by the engine speed.

Mode 3 is a manual mode. In this mode of operation, MRHPS functions similar to a steering system without any power assist.

Mode 4 is a fixed duty cycle mode. In this mode, a default PWM duty cycle is provided to the output current driver 30 to produce a fixed coil current to give acceptable steering assist.

Mode 5 is a voltage control mode. In this mode, the PWM duty cycle is calculated based on the power steering pump speed without using the coil current loop.

One of the above mentioned modes is selected as a default mode of operation during each of the following conditions. The correspondence between the conditions and the modes has also been described below.

A first condition is priming of a power steering pump. When the ignition is turned on and the engine is started, the engine momentarily runs at a speed higher than normal idle speed. Further, in a conventional hydraulic power steering system, the power steering pump follows the engine speed to reach high speed in order to get primed properly. In the MRHPS system, to provide normal start up and proper priming conditions, the system is operated in mode 2. The coil current is set to a high value for sufficient time duration so that the magneto-rheological clutch follows the engine speed to properly prime the power steering pump.

Figure 7:
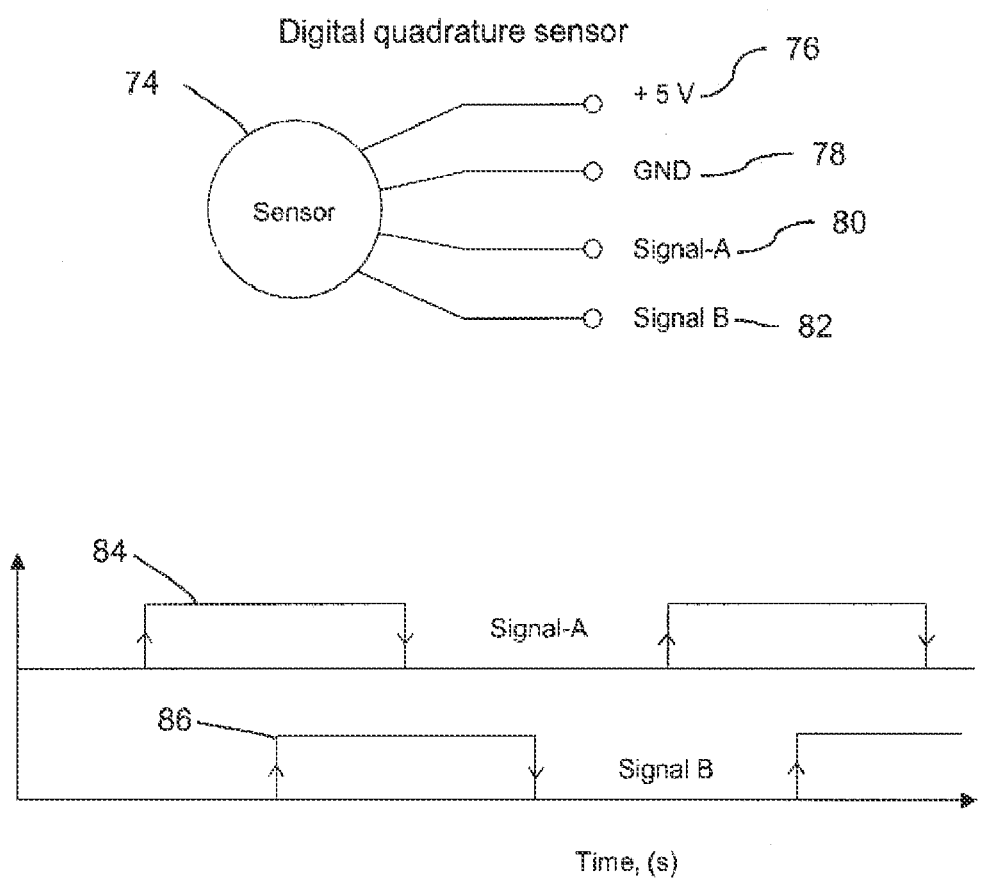
FIG. 7 illustrates a digital quadrature sensor for measuring an instantaneous power steering pump speed and an exemplary quadrature signal provided by the quadrature sensor.

A second condition, which is a fault condition, is a power steering pump speed sensor failure. As shown in FIG. 7, a digital sensor 74 is used to measure the speed of the power steering pump. Lines 76 and 78 provide power to the sensor 74. Signal channel A 80 and signal channel B 82 provide digital quadrature signals 84 and 86 based, respectively, on the measured speed of the power steering pump. If the power supply fails, the system is operated in mode 4 by applying a fixed PWM duty cycle to the coil 36. Also, an appropriate flag is set for the mentioned condition. If only one of the channel A 80 or channel B 82 fails, the system operates in mode 1. In this mode, the available channel of the sensor 74 is used for measuring the power steering pump speed. If both channel A 80 and channel B 82 fail, the system operates in mode 4 by applying a fixed PWM duty cycle to the coil 36. Also, an appropriate flag is set for the mentioned condition.

Figure 8:
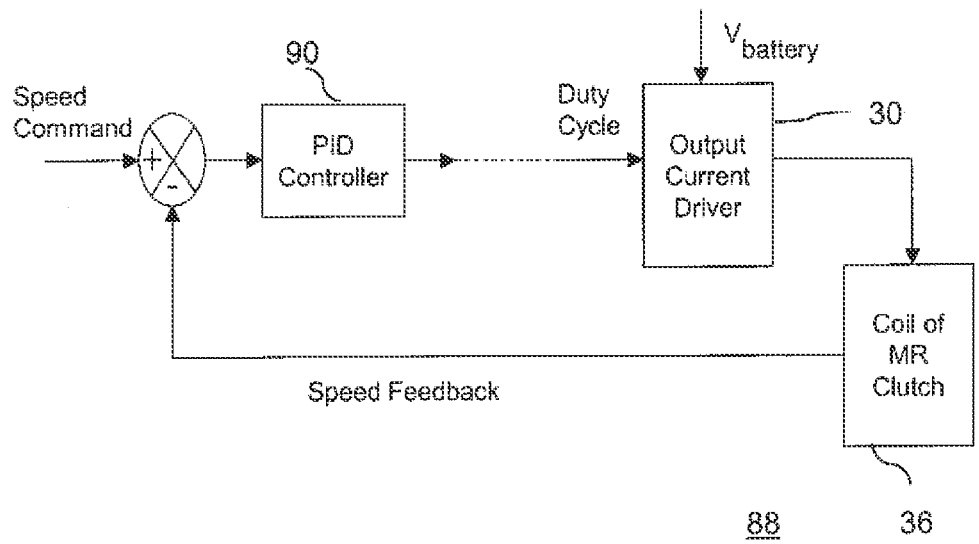
FIG. 8 illustrates calculating of a PWM duty cycle based on the power steering pump speed without using the coil current loop.

A third condition is a current sensor fault condition. A current sensor is used to measure the coil current. If the current sensor fails and the value of coil current is not obtained, the system is operated in mode 5. The duty cycle is calculated based on the power steering pump speed without using the coil current loop. FIG. 8 shows a schematic diagram of mode 5 where the PWM duty cycle is calculated by a feedback control loop 88. The duty cycle is calculated by a PID controller 90 based on the power steering pump speed feedback. A control signal is applied to the output current driver 30 to drive the coil 36.

Figure 9:
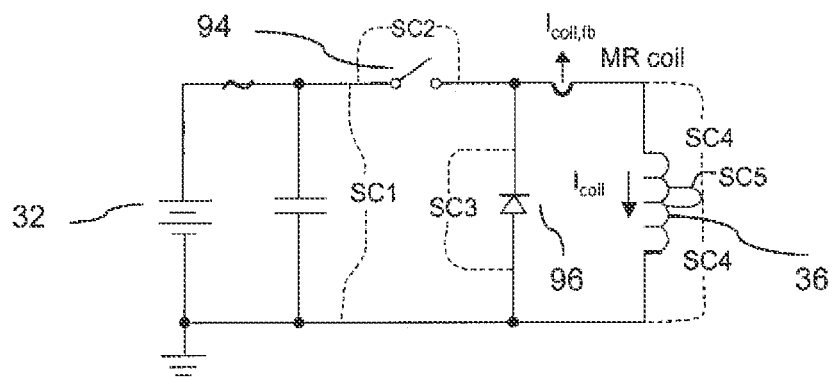
FIG. 9 illustrates the various types of short circuits that can occur in an MRHPS system.

A fourth condition is a short circuit fault condition. As shown in FIG. 9, one or more of the short circuit faults SC1, SC2, SC3, SC4 or SC5 may occur in the system. FIG. 9 shows an operating circuit 92 of the system. SC1 is a direct short across the power supply such that no power is received from the battery 32 and may result in a blown fuse. A power electronic switch 94 is used to control the current flowing in the circuit 92. SC2 is a power electronic switch short circuit across the power electronic switch 94 such that control over the current flowing in the circuit is disabled as battery directly drives the current based on the coil resistance and may result in overheating of the clutch. SC3 is a diode short circuit across diode 96, again leading to a direct short circuit and loss of control over the current flowing in the circuit. SC4 is a partial short circuit between the power supply line and a turn in the coil 36 such that some of the turns of the coil 36 are short circuited. SC5 is a partial short circuit between a number of turns in the coil 36 such that some of the turns of the coil are short circuited. If a short circuit SC1 occurs, the system operates in mode 3. If a short circuit SC2 occurs, the system operates in mode 2 and eventually may fail. If a short circuit SC3 occurs, the system is operated in mode 3 and if short circuit SC4 or SC5 occurs, the system operates in mode 1.

A fifth condition is an open circuit fault condition. In this condition one of the multiple open-circuit faults, such as an open-winding, open current sensor, power switch fault, gate drive fault and open connector terminal, is detected in the system. In an open circuit fault, no current flows in the coil 36. On detection of an open circuit fault condition, the system is operated in mode 3, that is, the manual mode.

Figure 10:
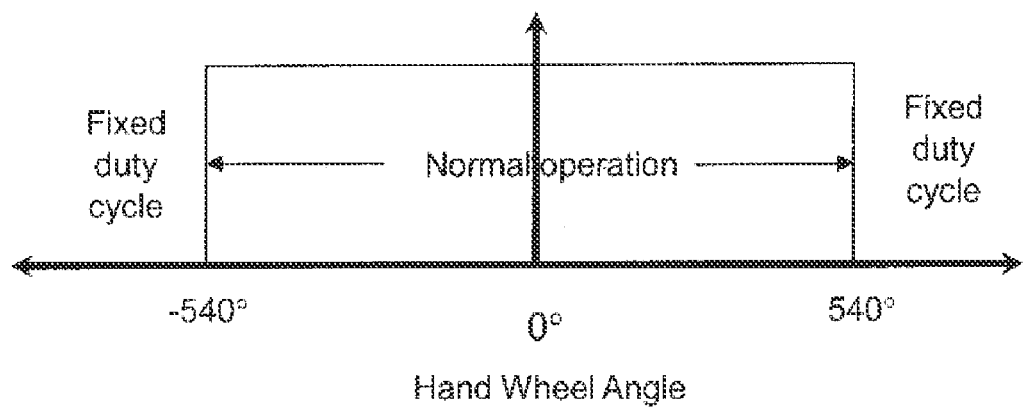
FIG. 10 shows an exemplary range of hand-wheel angles for normal operation mode and fixed duty cycle mode.

A sixth condition is an end of travel protection. The end of travel protection condition is detected when the hand-wheel angle is greater than a predetermined maximum value. On detection of the end of travel protection condition, the system is operated in mode 4 where a fixed PWM duty cycle is applied to the coil 36 in order to avoid blow out of the pressure relief valve and the associated hissing noise. FIG. 10 shows an exemplary range for the hand-wheel angle for normal operation mode and fixed duty cycle mode.

A seventh condition, which is a fault condition, is an over temperature protection. The temperature of the coil 36 is measured using a thermistor. The temperature is also estimated using the coil resistance. If the coil temperature is more than a predetermined maximum value of the coil temperature, the fault is rectified by one of the following two methods.

The first method is to limit the PWM duty cycle using equation (8).

$$D_p = D_p \left[ \frac{(T_{c,max} - T_c)}{(T_{c,max} - T_{limit})} \right] \quad (8)$$

Where $T_{c,max}$ is the maximum allowable coil temperature, $T_{limit}$ is the limiting coil temperature beyond which point the PWM duty cycle will be reduced, and $D_p$ and $T_c$ are as described in FIG. 2. In the second method, the system is operated in mode 2.

Various embodiments of the present invention offer one or more advantages. The present invention provides a method for determining an optimum speed of a power steering pump used in a power steering assembly of a vehicle for improving the fuel economy of the system. The method further relates to managing of faults occurring in the power steering system. The method includes determining the speed of the power steering pump based on the hand-wheel angle, hand-wheel angle rate and the vehicle speed. Hence, it results in better fuel economy, better ride feel and control both at high and low vehicle speeds and an uninterrupted operation by managing various possible fault conditions occurring in the power steering system when possible.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for managing faults in a magneto-rheological hydraulic power steering (MRHPS) system, said method comprising:
   using one or more sensors to detect a fault condition in the MRHPS system;
   using a controller to select a safe mode from a plurality of predetermined safe modes based on the fault condition that is detected, wherein the plurality of predetermined safe modes include a normal operation mode, an engine speed follow mode, a manual mode, a fixed duty cycle mode and a voltage control mode; and
   applying the safe mode to manage the fault condition.

2. The method according to claim 1 wherein the engine speed follow mode is selected based on the detection of at least one of a group of fault conditions comprising a pump priming condition, a short circuit without fuse blown fault condition and an over temperature protection condition.

3. The method according to claim 1 wherein the manual mode is selected based on detection of at least one of a group of fault conditions comprising an open circuit fault condition and a circuit with fuse blown condition.

4. The method according to claim 1 wherein the fixed duty cycle mode is selected based on detection of at least one of a group of fault conditions comprising a pump speed sensor failure condition and an end of travel protection condition.

5. The method according to claim 1 wherein the voltage control mode is selected based on the detection of a current sensor failure condition.

6. A method for managing faults in a magneto-rheological hydraulic power steering (MRHPS) system, said method comprising:
   using one or more sensors to detect a fault condition in the MRHPS system;
   using a controller to select a safe mode from a plurality of predetermined safe modes based on the fault condition that is detected; and
   applying the safe mode to manage the fault condition.

7. The method according to claim 6 wherein the MRHPS system includes a power steering pump, an electronic controller including a current driver that provides a pulse width modulation (PWM) signal and a coil that receives the PWM signal.

8. The method according to claim 7 wherein one of the plurality of predetermined safe modes is an engine speed follow mode where the PWM signal follows a closed loop control so that the speed of the power steering pump is directly governed by engine speed.

9. The method according to claim 8 wherein the engine speed follow mode is selected if a pump priming fault condition is detected, where priming of the power steering pump is required.

10. The method according to claim 8 wherein the engine speed follow mode is selected if a short circuit without fuse blown fault condition is detected where a short circuit fault condition occurs in the controller of the MRHPS system.

11. The method according to claim 8 wherein the engine speed follow mode is selected if an over temperature fault condition of the coil is detected.

12. The method according to claim 7 wherein one of the plurality of safe modes is a manual mode that operates the MRHPS system without power assist.

13. The method according to the claim 12 wherein the manual mode is selected if an open circuit fault condition is detected where no current flows in the coil.

14. The method according to claim 13 wherein the open circuit fault condition occurs if an open-winding, an open current sensor, a power switch fault, a gate drive fault or an open connector terminal occurs.

15. The method according to claim 12 wherein the manual mode is selected if a fuse blown fault condition is detected.

16. The method according to claim 7 wherein one of plurality of safe modes is a fixed duty cycle mode that produces a fixed coil current in the coil to provide steering assist.

17. The method according to the claim 16 wherein the fixed duty cycle mode is selected if a pump speed sensor failure fault condition is detected.

18. The method according to claim 16 wherein the fixed duty cycle mode is selected if an end of travel protection fault condition is detected when a hand-wheel angle is greater than a predetermined maximum value.

19. The method according to claim 7 wherein one of the plurality of safe modes is a voltage control mode where the PWM signal is based on the power steering pump speed without using a coil current loop.

20. The method according to the claim 19 wherein the voltage control mode is selected if a current sensor failure fault condition is detected where failure of a current sensor that measures the coil current occurs.

* * * * *